United States Patent [19]

Kneer

[11] 4,249,929
[45] Feb. 10, 1981

[54] METHOD OF DIGESTING ORGANIC WASTES

[76] Inventor: Franz Kneer, Am Honigbaum 6, D-6345 Eschenburg-Eibelshausen, Fed. Rep. of Germany

[21] Appl. No.: 956,784

[22] Filed: Nov. 1, 1978

Related U.S. Application Data

[63] Continuation of Ser. No. 791,949, Apr. 28, 1977, abandoned, which is a continuation-in-part of Ser. No. 705,519, Jul. 15, 1976, abandoned, which is a continuation of Ser. No. 579,880, May 22, 1975, abandoned, which is a continuation of Ser. No. 409,718, Oct. 25, 1973, abandoned, and a continuation-in-part of Ser. No. 544,041, Jan. 27, 1975, abandoned, which is a continuation of Ser. No. 354,174, Apr. 25, 1973, abandoned.

[30] Foreign Application Priority Data

Oct. 25, 1972 [DE] Fed. Rep. of Germany ....... 2252188
Oct. 28, 1972 [DE] Fed. Rep. of Germany ....... 2253009
Apr. 14, 1973 [DE] Fed. Rep. of Germany ....... 2318978

[51] Int. Cl.³ ............................................ C02F 11/16
[52] U.S. Cl. ............................................ 71/9; 71/10; 71/13; 210/609; 210/612; 210/630
[58] Field of Search ...................... 71/9, 12, 13, 27, 62, 71/64 G, 10; 210/2-10, 12, 14, 15, 18, 63 R, 16

[56] References Cited

U.S. PATENT DOCUMENTS

| | | | |
|---|---|---|---|
| 2,474,833 | 7/1949 | Eweson | 71/9 |
| 2,947,619 | 8/1960 | Gorley | 71/9 |
| 2,969,279 | 1/1961 | Pierson | 71/9 |
| 3,138,448 | 6/1964 | Schulze | 71/9 |
| 3,235,369 | 2/1966 | Eweson | 71/9 |
| 3,285,732 | 11/1966 | Schulze | 71/9 |
| 3,441,400 | 4/1969 | Othhalek | 71/646 |
| 3,607,737 | 9/1971 | Gamer | 210/12 |
| 3,725,258 | 4/1973 | Spector et al. | 210/15 |
| 3,756,784 | 9/1973 | Pittwood | 71/9 |
| 3,794,582 | 2/1974 | Lackme et al. | 210/11 |

FOREIGN PATENT DOCUMENTS

2252188 3/1974 Fed. Rep. of Germany.
2253009 3/1974 Fed. Rep. of Germany.
2318978 10/1974 Fed. Rep. of Germany.

*Primary Examiner*—Peter A. Hruskoci
*Attorney, Agent, or Firm*—Toren, McGeady and Stanger

[57] ABSTRACT

In the disclosed method, organic waste material of a water content of at least about 50% and a solid content of at least about 15% is biologically digested into compost. The organic waste material contains a flora of different species of microorganisms having different oxygen consumption requirements and different metabolism. The organic waste material is introduced into an aerating reactor with top inlet and bottom discharge so as to form an air permeable material column in the reactor. Air, which may be enriched with oxygen, is blown through the column in an upward direction without mechanical agitation of the column. Since the flora of microorganism species present in the material has different oxygen consumption requirements and different metabolism, the air flow is controlled in such a way that the microorganisms can settle at distinct levels within the reactor space where the environmental conditions are most favorable. In this manner a plurality of distinct zones of different temperature and different oxygen content are formed at different levels of the reactor. These zones remain substantially stationary while the method is carried out, although the material column descends through the reactor. The organic waste material is permitted to digest until compost has been formed in the lowermost portion of the reactor space. This compost is withdrawn and fresh material is added through the top of the reactor to make up for the withdrawn compost.

14 Claims, 1 Drawing Figure

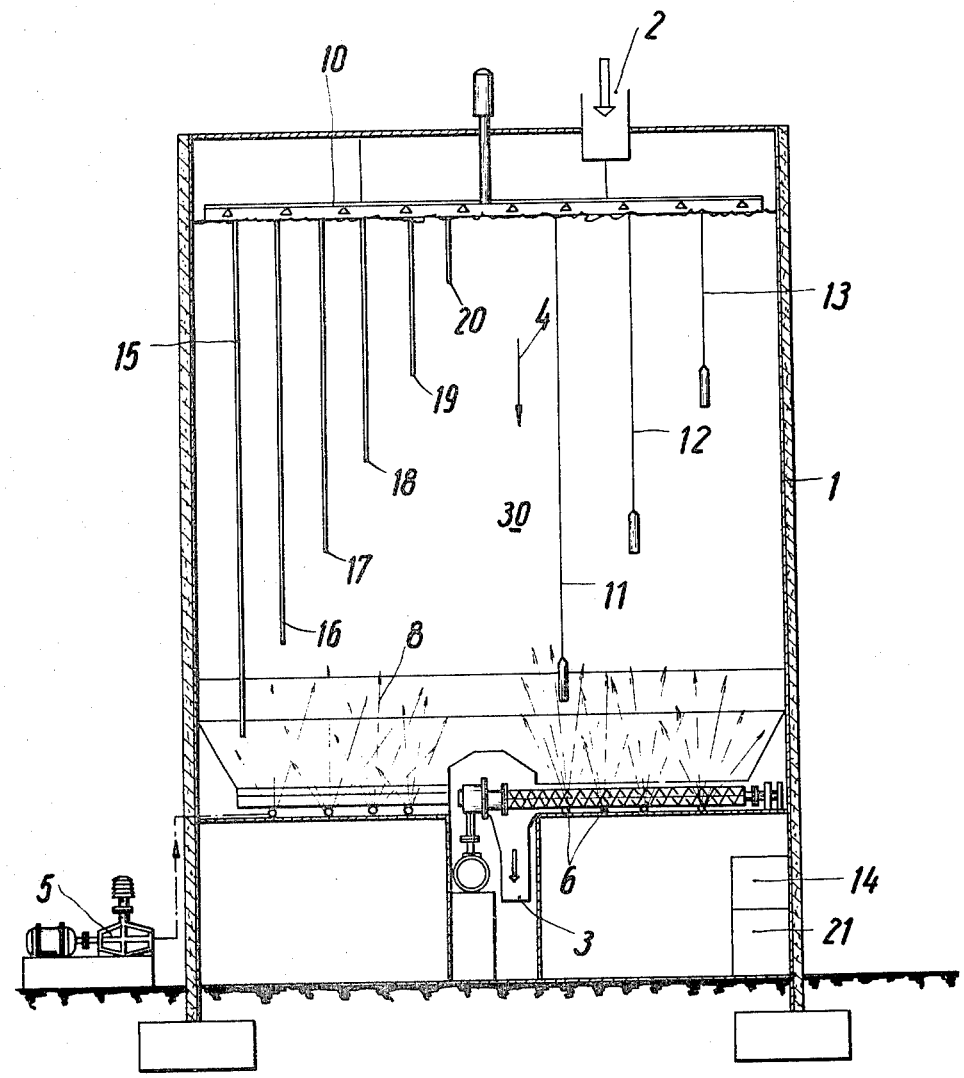

METHOD OF DIGESTING ORGANIC WASTES

CROSS-REFERENCE TO PRIOR APPLICATIONS

This is a continuation of application Ser. No. 791,949, filed Apr. 28, 1977 now abandoned which, in turn, is a continuation-in-part of application Ser. No. 705,519, filed July 15, 1976, now abandoned, which, in turn, was a continuation of application Ser. No. 579,880, filed May 22, 1975, now abandoned, which, in turn, was a continuation of application Ser. No. 409,718, filed Oct. 25, 1973, now abandoned; as well as a continuation-in-part of application Ser. No. 544,041, filed Jan. 27, 1975, now abandoned, which, in turn, was a continuation of application Ser. No. 354,174, filed Apr. 25, 1973, and now abandoned.

FIELD OF INVENTION

The invention generally is directed to the biological digestion of organic waste material and is particularly concerned with a method for the composting or digestion in an aerobic atmosphere of raw garbage or of concentrated sludge, such as clarification sludge or sewage sludge emanating from activated sludge waste treatment plants. The inventive procedure is predicated on the decaying or biological breakdown or decomposition of the organic waste material which is controlled by the amount of air (oxygen) supplied to the material to be digested.

While the inventive procedure is applicable to the digestion or composting of organic waste materials in general, it is particularly suitable for the biological digestion of concentrated sewage sludge and garbage and thus will be explained in connection therewith.

BACKGROUND INFORMATION AND PRIOR ART

The sewage systems of towns and cities customarily discharge into a sewage processing plant. The incoming sewage usually has a water content of about 96% or more and is subjected to aeration, settling, sedimentation and compression procedures resulting in a sludge product of a water content of about 70-80% (hereinafter "concentrated sewage sludge"). The disposal of this concentrated sewage sludge presents an enormous problem. In many instances, the sludge is simply dumped at high sea where it has a tendency to pollute the water and to cause great damage to marine life. According to another proposal, the concentrated sewage sludge is subjected to decaying (putrefaction) procedures in open or closed decomposition spaces resulting in the liberation of methane.

This prior-art procedure is relatively time-consuming and cumbersome and requires plants of large surface area. Further, the putrefied or decomposed sludge obtained in this manner can only conditionally be used as fertilizer since no reliable and safe hygienization takes place under the anaerobic conditions prevailing during the putrefaction or decomposition.

It has also been proposed to add clarification sludge in certain volume percentages to organic waste to be digested, thereby to digest the sludge jointly and simultaneously with the organic waste. However, also according to this procedure only relatively small amounts of sludge can be processed so that, from a practical point of view, the sludge has to be disposed of essentially by deposition.

Concentrated sewage sludge of the kind here discussed contains a flora of predominantly anaerobic microorganism species.

In all prior-art procedures of this kind, care is taken that an excess of oxygen is available in all areas of the reactor where the material to be digested is present.

The closest prior art is, in applicant's opinion, represented by the following:

| German Patents | 1,139,856, filed June 12, 1969 | 673,066, 946,547. | 805,044. |
|---|---|---|---|
| German Offenlegungsschrifts | 1,929,767, filed February 22, 1967 | 2,201,789. filed January 14, 1972 | |
| German Auslegeschrifts | 1,592,729, filed July 19, 1966 | 1,929,767, 1,592,800. | 1,301,828, filed January 15, 1966 |

SUMMARY OF THE INVENTION

It is a primary object of the present invention to provide a procedure for the biological digestion of concentrated sewage sludge or garbage into compost which latter can be directly utilized, for example, for fertilizer purposes, as top soil, and the like.

Generally, it is an object of the present invention to improve on procedures for the biological digestion of concentrated sewage sludge and garbage.

In accordance with the invention, it has been ascertained that concentrated sewage sludge can be directly biologically digested into compost by providing an aerobic atmosphere.

Pursuant to the inventive procedure, as applied to concentrated sewage sludge, the sludge—which has a water content of about 70°-80° C.—is first admixed with an amount of a particulate organic carbon-containing material to enable aerobic microorganisms to multiply. Such particulate carbon-containing material may be sawdust, peat, straw and compost material which has been ultimately obtained by the inventive procedure and which is recycled for this purpose.

Concentrated sewage sludge contains a flora of microorganism species of predominantly anaerobic type. Since such microorganisms obviously are unsuitable for carrying out a biological digestion procedure under aerobic conditions, the inventive procedure is expedited and facilitated by introducing material containing aerobic microorganisms into the sludge system. From a practical point of view, many carbon-containing organic materials available on the market do predominantly contain aerobic microorganisms. Thus, for example, if commercially available sawdust is used for raising the amount of carbon material, the sawdust at the same time introduces aerobic microorganisms since sawdust contains predominantly microorganisms of that kind. It should be emphasized, however, that the inventive procedure can be successfully carried out without artificially introducing extraneous aerobic microorganism species since the original concentrated sewage sludge does contain aerobic microorganisms as well. However, introduction of aerobic microorganisms substantially facilitates and expedites the digestion procedure.

The original water content of the concentrated sewage sludge, which—as stated—is about 70°–80° C., is not substantially affected by the admixture with sawdust or similar organic materials since such materials usually have high water content.

The concentrated sewage sludge-carbon-containing organic material mixture, thus containing extraneously added aerobic microorganism species, is now introduced through the top inlet of an aerating container or reactor and thus falls to the bottom thereof. At the same time air is blown through the reactor in an upward direction, the air thus flowing in countercurrent to the incoming sludge mixture.

As is well known, different microorganism species have different oxygen consumption requirements and metabolism. This known fact is utilized in the inventive digestion procedure by controlling the air flow in such a way that, after a short time, the different microorganism species substantially permanently settle within the reactor space at those levels where they find the most favorable environmental living conditions. Thus, once the reactor has been started up and filled with the sludge-carbon-containing material mixture, a kind of equilibrium condition sets in, due to the constant ascent of the introduced air, this equilibrium condition resulting in the formation of a plurality of distinct zones of different temperature and different oxygen content at the different levels of the reactor. These zones, which remain substantially stationary while the procedure is carried out, may be defined as follows:

The zone of the highest temperature is located in the uppermost third of the reactor and the temperature thereof is sufficiently high so as to destroy pathogenic germs which are contained in the incoming sludge material. By contrast, the zone of the lowermost temperature is located adjacent the bottom of the reactor. The zone of the lowest oxygen content is located in the uppermost portion of the reactor, where the least amount of oxygen is offered since the incoming sludge material contains predominantly anaerobic microorganisms. The zone of the highest oxygen content is formed, by contrast, adjacent the bottom of the reactor, where a larger amount of oxygen is offered. Between the zones of highest and lowest temperature and oxygen content, intermediate or transition zones of temperatures and oxygen content between the extreme values are formed.

The composting procedure within the reactor takes about 14-20 days, during which time each layer or stratum of the concentrated sewage-carbon material mixture will have passed or descended through each of the zones previously referred to. The compost material formed in the lowermost portion of the reactor space is withdrawn through the bottom outlet of the reactor while fresh material is added through the top to make up for the withdrawn compost. In this manner, a continuously descending material column is formed in the reactor which during its descent passes through each of said zones while air rises in counter-current.

As stated, the highest temperature zone is formed in the uppermost third of the reactor and will normally be of a value of about 70°–80° C. which is high enough to destroy pathogenic germs.

As stated, the oxygen content is contingent on the amount of air which is blown from the bottom of the reactor through the descending column. If desired, the air may be enriched with oxygen. In order properly to monitor the conditions within the reactor space, probes are provided at various levels of the reactor which measure the oxygen and/or $CO_2$ content and the temperature. Dependent on the measured values, the supply of air may be properly adjusted.

The moisture content should be at least 50%. Since concentrated sewage sludge has a water content of 70–80%, no problem arises in this respect. If desired or found necessary, water may be trickled through the descending material. If raw garbage instead of concentrated sewage sludge is to be digested in accordance with the inventive procedure, a suitable amount of water will have to be added to the garbage.

Another distict difference between the digestion of concentrated sewage sludge and garbage is that the latter already contains a sufficient amount of carbon material so that normally it will not be necessary to add any carbon-containing material. Otherwise, the procedure is the same.

The air is suitably blown through the reactor by means of a blower and may be supplied in the form of a stream of small bubbles over the entire cross-section of the material column.

It is also within the scope of the invention to admix bentonite in powder form. About 7.5 to 12.5 kilograms of bentonite per cubic meter of material yield excellent results.

In accordance with the invention, concentrated sewage is admixed with an organic carbon comprising material, and the mixture thus obtained is continuously passed in a downward direction through an aerating reactor or tank. The air which is required for the sludge digestion or decomposition procedure may be enriched by admixing it with oxygen and, in a controlled manner, is continuously passed through the aerating tank from the bottom of the tank in an upward direction so that the descending sludge column moves in countercurrent to the rising air. During the decaying, oxygen is continuously consumed and carbonic acid ($CO_2$) is producedby the aerobic microorganisms in the sludge. This is an exothermic reaction. Thus, zones of different temperatures and different oxygen concentrations ($O_2$-content) result at different locations in the reactor of which the zone of the highest temperature is situated in the uppermost third of the reactor space while the zone of the lowest temperature is formed at and adjacent the outlet of the reactor. The zone of the highest oxygen content is formed near the bottom of the reactor and the zone of the lowest oxygen content is present in the uppermost layer of the aeration reactor. Zones of intermediate temperaure and oxygen content are formed between the extreme value zones. The microorganisms themselves colonize or settle in those zones which offer them according to their specific characters the best biological living conditions. Due to these different temperatures and oxygen zones it is rendered possible, for the first time, efficiently to digest or compost sewage sludge of customary composition on an industrial scale, thereby to form a digested product, to wit, compost, which can be directly utilized.

The admixture of the sludge, prior to entering the aerating tank or reactor, with an organic carbon-containing material, also facilitates the aeration. Further, by adding pure oxygen to the air which is passed through the reactor, the different bacterial contained in the sludge which have widely different oxygen requirements, may be favorably influenced from a digestion point of view so that a completely aerobic decomposition of the sludge takes place and an efficient breakdown of the sludge is accomplished. Although the sludge passes through the aerating reactor continuously and in countercurrent relative to the ascending air, distinct zones in respect of temperature and oxygen content are formed in the aerating reactor by the controlled flow of air through the reactor. These different zones are occupied by specific microorganism strains, dependent on the oxygen and temperature requirements of these strains. In this manner, an efficient separation of the microbiological breakdown in different layers or strata is obtained which, in turn, results in an optimization of the digestion process. The biological activity can thus be readily determined by measuring the oxygen or $CO_2$ content and also the temperatures in the different layers of the sludge which continuously descends through the reactor. Dependent on these measurements, the amount of air which is passed through the reactor is defined and thus the aeration is determined. As the air flows in countercurrent to the descending material, a so-called heat-damming or accumulation zone is formed in the uppermost third of the reactor space of a temperature of about 70°–80° C. This temperature zone may be maintained relatively exactly in a predetermined upper region of the aerating reactor by the continuous counterflow aerating procedure of the invention. The sludge which is added through the top of the reactor must thus pass through this relatively hot zone. Pathogenic germs in the sludge are thus destroyed while passing through this hot zone which, in turn, results in an intense sanitization. The material which is introduced into the aerating reactor which may be oculated with suitable bacteria, descends slowly through the reactor within a period of about 14–20 days. In descending through the reactor, the sludge passes through all the different distinct temperature zones and thus also through the zones of different oxygen content. It will be appreciated that the specific microorganisms accumulate and concentrate in these zones in which they find their specific most suitable life conditions, to wit, in those zones where they thrive and thus can develop their optimum activity. In spite of continuous operation, a complete digestion and sanitization of the sludge is thus obtained.

A variety of organic carbon-containing materials may be used for the purposes of this invention. Particularly favorable results have been obtained with peat, sawdust, straw and in particular compost which is recycled from the digestion process of the invention.

According to one embodiment of the invention, the air which is passed through the tank or reactor is enriched with about 2-10% by volume of pure oxygen calculated on the amount, by volume, of air.

The aeration of the reactor is advantageously effected by means of a blower. In order to obtain advantageous distribution of the air through the descending sludge, it is advantageous to supply the air through a nozzle system through which the gas exists in the form of fine bubbles over the entire cross-section of the reactor space.

In order properly to control the digestion procedure, gas samples are withdrawn from different levels of the aerating reactors, preferably from three different spaced zones. The oxygen and/or the $CO_2$ content of these samples is then determined and, in dependence of the results obtained, the amount of air is increased or reduced. The results of the sampling may be recorded by means of $O_2$ or $CO_2$ recorders in conventional manner and automatic control of the air and oxygen supply may be arranged in dependence on the results.

Further, in order to monitor the digestion procedure, the temperature may be measured at several spaced, preferably three or six zones of the sludge material contained in the reactor. Also the temperature values thus measured can, of course, be recorded by means of a temperature recorder.

The moisture desired during the procedure can be easily obtained by trickling water onto the uppermost layer or stratum of the sludge column in the reactor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

The single FIGURE of the drawing shows a concentrated sludge-digesting reactor suitable for carrying out the inventive method.

Referring now to the drawing, the aerating reactor 1 in which the inventive procedure may be carried out, is heat insulated and is provided with a supply or feeding arrangement generally indicated by reference numeral 2. The sludge of a water content of about 70% is admixed with an organic carbon-containing material, such as sawdust. The sawdust is rich in aerobic microorganisms. The sludge-sawdust mixture is continuously supplied through the supply means 2 to descend slowly through the reactor space and to form an air-permeable column 30 therein. Once the reactor is filled, fresh material requires 14–20 days for complete digestion into compost. The digested compost material formed near the bottom of the reactor is withdrawn from the reactor 1 through a discharge arrangement generally indicated by reference numeral 3, the discharge 3 being provided at the bottom portion of the reactor 1. Fresh sludge-sawdust mixture is added through a supply arrangement in order to replenish withdrawn compost. The sludge, enriched with carbon-containing material, thus migrates in the direction of arrow 4 through the reactor space where it forms the descending column 30. Due to the activity of the microorganisms the sludge-column 30 embraces different and distinct zones in respect of temperature and oxygen content.

Through a blower 5, air is constantly blown through the reactor space. The air may be enriched with pure oxygen which emanates, for example, from a container 25. The air is blown through the aerating reactor through the nozzle system 6 through which the air passes in the form of fine bubbles over the entire cross-section of the reactor, the air or air-oxygen mixture thus rising through the reactor in the direction of the arrows 8, in counterflow to the descending sludge-column 30.

The incoming sludge material which thus forms the column 30 within the reactor 1 may be moistened to the desired extent by the trickling arrangement generally indicated by reference numeral 10.

The sludge column 30 is relatively loose due to the admixture with the carbon-containing material and thus is readily aerated by the ascending air. By means of probes indicated by reference numerals 11, 12 and 13, gas samples are taken from three different zones of the reactor and the oxygen and/or carbon dioxide content of these gas samples is determined and recorded by means of a recorder 14 as diagrammatically indicated in the right-hand bottom corner of the drawing. Further, temperature measuring probes 15 through 20 are provided within the reactor space to measure the temperature at different areas, the measuring results also being recorded by a recorder 21. These measurements serve the purpose of monitoring the digestion procedure and to control the amount of air (oxygen) to be supplied.

As will be apparent from the above, the structurally improved sludge is continuously fed to the aerating reactor and descends through the reactor slowly but continuously and in countercurrent to the rising air. The reactor is completely filled with sludge during the digestion procedure. In other words, the amount of digested material which is withdrawn at the bottom of the reactor through the discharge 3 is continuously replaced by fresh material added through the inlet 2. The charging of the reactor is thus essentially continuous from the top while the discharge of the digested material takes place essentially continuously from the bottom, the amount of discharged compost being replenished by fresh material. During this continuous passage of the sludge through the reactor, the entire amount of air and oxygen required for the procedure ascends in countercurrent and continuously through the reactor. The air leaves the reactor through the top.

It will furthermore be appreciated that the biological breakdown of the sludge column within the reactor is effectively influenced and accomplished by creating different temperature zones of different oxygen content by said microorganisms. This is essentially effected by the amount of oxygen available in the different zones of the reactor. When the temperature rises too high, which is indicated by higher values of $O_2$ or lower values of $CO_2$ than are normal in the uppermost third of the reactor space, the air supply is to be reduced, and vice versa. The amount of oxygen in the mentioned zones is, in turn, influenced by the air volume which is blown through the reactor. Thus, by controlling the air supply and the amount of oxygen supplied with the air, the zones can be moved within certain limits or displaced both in respect of their temperature and also in respect of their oxygen content within the aerating space of the reactor.

Sludge of the kind with which this invention is concerned has a relatively high content of sodium and heavy metal ions which, after the digestion, are recycled to the biological cycle. These ions then form accumulations in plant and animal organisms. This is undesired.

According to a further feature or modification of the invention, means are thus proposed to decrease the amount of sodium and heavy metal ions in the digested sludge. In other words, the amount of sodium and heavy metal ions leaving the reactor should be reduced in relation to the amount of these ions as contained in the incoming undigested sludge.

This feature of the invention is solved by adding to the sludge bentonite flour, to wit, bentonite in powder form. Particularly favorable results are obtained if the amount of bentonite is about 7.5 to 12.5 kg per cubic meter of sludge.

As is well known, bentonite is a clay mineral having a very pronounced swelling and absorption capacity. The main component of bentonite is montmorillonite. Bentonite has the characteristics that calcium ions bonded to the bentonite molecule are exchangeable for the sodium or heavy metal ions contained in the sludge. Further, bentonite contains clay compounds. These clay compounds form clay-humus complexes, in which the sodium ions contained in the sludge are fixed. These complexes are water-insoluble and thus precipitate. The same applies to heavy metal ions. The addition of bentonite flour or meal to the sludge in the indicated quantities prior to the passage of the sludge through the reactor results thus in a very positive action during the digestion procedure, since the compost which is discharged from the aerating tank contains significantly less sodium and heavy metal ions. Digested sludge of this kind, and due to the presence of clay-humus complexes, contains in addition to the main nutrients and micronutrients also a plurality of organic compounds and microorganisms and thus contributes to the reestablishment of the biological equilibrium of soil fertilized with the compost. The clay-humus complexes, moreover store needed moisture due to the inner crystalline swelling capacity of the montmorillonite cyrstals and thus impart the soil with an advantageous and desired grainy or crumb-like structure.

The inventive process will now be described by Examples, it being understood that these Examples are given by way of illustration and not by way of limitation and that many changes may be effected without affecting in any way the scope and spirit of the invention as recited in the appended claims.

EXAMPLE 1

This experiment was carried out in an aerating reactor of the kind shown in the drawing. The reactor had a volume of about 20 cubic meters and a height of 4 meters. Concentrated sewage sludge of a water content of 70% was admixed with 20% by volume of an organic carbon-containing material in the form of sawdust and the mixture was then continuously introduced through the inlet arrangement 2 of the reactor to form the descending column 30 as indicated in the FIGURE. The resulting mixture now contained appreciable amounts of aerobic microorganisms. Compost was withdrawn through the withdrawal device 3. The compost smelled like fresh forest soil. The sludge slowly descended through the reactor within a time period of 20 days and 20 cubic meters of air enriched by 2% of pure oxygen was blown through the reactor per hour.

The following temperature values were measured at various levels of the reactor height from the bottom of the reactor in an upward direction at distances of 70 cm:

| | |
|---|---|
| At a height of 70 cm | 40° C. |
| At a height of 140 cm | 55° C. |
| At a height of 210 cm | 64° C. |
| At a height of 280 cm | 71° C. |
| At a height of 350 cm | 78–80° C. |

It will thus be noted that the highest temperature or hot zone is located in the top portion of the reactor.

The following oxygen contents were measured, again from the bottom in an upward direction:

| | |
|---|---|
| At a height of 100 cm | 18–20% |
| At a height of 200 cm | 15–18% |
| At a height of 300 cm | 12–15% |

The air leaves the reactor through the inlet arrangement 2 with 10% $O_2$ and 7–8% $CO_2$ concentration.

EXAMPLE 2

The experiment was repeated but per cubic meter of sludge material, 7.5–10 kg of bentonite powder were added to the sludge. While the sludge at the inlet of the reactor contained less than 100 grams heavy metal components (heavy metal ions) per cubic meter, the amount of heavy metal components at the discharge was only traces of impurity of heavy metal ions per cubic meter.

As a general proposition, the amount of organic carbon-containing material should be between about 5–20 percent by volume, calculated on the sludge volume.

EXAMPLE 3

Example 1 was repeated with comminuted raw garbage. No sawdust was added. The water content was 50%. Compost was formed in the same manner.

Turning now more specifically to the composting of garbage, in a known process of this kind, organic wastes (garbage), after comminution in a disintegrating mill of conventional type, are charged to a container into which a quantity of air is introduced, the amount depending on the volume of the charge. The air is fed intermittently from underneath, by suction or by blowing, each blow being followed by a pause. The pauses are adjusted so as to equalize the temperature at all levels in the body of material and to keep the $O_2$ concentration in the effluent gases above 10° by volume (compare the German patent specification (Ausleges-chrift No. 1,592,729). An excess of oxygen is present throughout the system.

Each blow of air initially produces an excess of oxygen which cannot immediately be breathed away by the decomposing microorganisms. After approximately one minute the entire depleted atmosphere in all the layers of the material is replaced by fresh air. During the decomposition process the rate of consumption of oxygen at first increases rapidly to a maximum and then decreases gradually in the course of several days. The lengths of the pauses are adjusted to suit the changing rate of oxygen consumption. Toward the end of the decomposition process the length of pause has increased to approximately 60 minutes. After completion of the decomposition of the material the container is emptied and can then be recharged.

An intermittent process of this kind involves a comparatively elaborate technology for controlling the decomposition. No optimum living conditions for the various species of microorganisms are created.

The aim in the present invention is to provide a continuous and easily controlled process for converting garbage into compost and to provide optimum environmental conditions for all available species of microorganisms.

The problem is solved, according to the invention, in that comminuted raw garbage, preferably mixed with sewage sludge, moves continuously through an aeration reactor, the air flowing continuously in countercurrent flow through the material, so that in different zones in the body of the material different temperatures and different $O_2$ concentrations prevail, the highest temperatures being in the upper third of the reactor, the lowest temperatures near its delivery outlet, the highest $O_2$ concentrations near the bottom of the reactor and the lowest near the top.

The garbage can, if desired, be mixed with a solid sewage sludge, the mixture being intimately mixed or homogenized in a mixing worm. The resulting homogenized mixture is then fed continuously into the aerating reactor. It should be observed that during the decomposition reaction the reactor is always entirely full. The decomposed material is removed from the bottom of the reactor at a delivery rate which is adjusted so as to keep the reactor constantly full. That is to say the reactor is continuously fed with material from above, decomposed material being withdrawn from the bottom at the appropriate delivery rate so that the reactor always remains full.

The entire supply of air required for the decomposition process is continuously fed into the reactor through its bottom. The material, therefore, migrates downwards through the reactor, the air moving continuously upwards, in countercurrent flow with respect to the material.

Consequently, there prevail in the body of the material in the reactor different zones where the temperatures and $O_2$ concentrations are different, these quantities being controllable by adjusting the rate of feed of air. The activities of microorganisms are influenced by the prevailing temperature, and by the moisture and oxygen concentration in the ambient atmosphere.

In the reactor the entire column of air, moving upwards from the bottom of the reactor towards the top and flowing countercurrent to the descending material is gradually deprived of its oxygen by the microorganisms. Consequently, the $O_2$ concentration decreases towards the upper part of the reactor. Due to the different natures of the different kinds of microorganisms they come to occupy different lvels, that is to say, different zones in the reactor, determined by the decreasing $O_2$ concentration from the bottom towards the top of the reactor.

The decomposition of the material is therefore effected in a series of layers each occupied by a different microbiological flora, producing a favorable layering of temperature zones. For example in the upper third of the reactor there is a heat-trap zone where the temperature is in the region of 80° C.

By adjusting the rate of feed of air the heat-trap zone can be made to occupy continuously and fairly precisely a particular, desired upper fraction of the reactor. Consequently the whole of the garbage-sludge mixture fed into the reactor from the top must necessarily pass through the high-temperature zone. This kills pathogenic germs. The comparatively hot zone at approximately 80° C. is of considerable hygienic importance in the treatment of garbage containing pathogenic microorganisms.

The material fed to the aeration reactor passes slowly but continuously downwards through the reactor in the course of 14 to 20 days, passing through the series of zones at different temperatures and of different $O_2$ concentrations.

If sewage sludge is admixed with the garbage there should not be more than 30% of sludge and it should be in the form of a solid sludge containing 70 to 75% of water.

What is claimed is:

1. A method for biologically digesting concentrated sewage sludge containing a plurality of anaerobic micro-organism species into compost, which comprises:
    (a) introducing aerobic micro-organisms by admixing the sludge with a sufficient amount of a particulate organic carbon-containing material containing predominantly aerobic micro-organisms;

(b) introducing the mixture thus obtained into an aerating reactor having a top inlet and a bottom discharge so as to form an air-permeable material column in said reactor, while blowing air through the material column in an upward direction of the column, said blowing being effected in such quantities that due to the different oxygen consumption and metabolism of the different micro-organism species, the latter settle at distinct levels within the reactor space to form a plurality of distinct zones of different temperature and different oxygen content at different levels of said reactor which zones remain substantially stationary and at equilibrium so that both aerobic and anaerobic digestion take place while the method is carried out, the zone of the highest temperature being located in the uppermost third of the reactor space while the zone of the lowest temperature is located adjacent the bottom of the reactor, the temperature of said zone of highest temperature being sufficiently high so as to destroy pathogenic germs, the zone of the lowest oxygen content being located in the uppermost portion of the reactor while the zone of the highest oxygen content is located adjacent the bottom of the reactor;

(c) permitting the mixture to digest until it has formed compost in the lowermost portion of the reactor space;

(d) withdrawing said compost through said bottom outlet and adding fresh mixture through said top inlet to make up for said withdrawn compost, to form a continuously descending column of said mixture in said reactor which, during its descent, passes through said zones while air passes countercurrently through the column and the spent air is removed from the top of the reactor.

2. A method as claimed in claim 1, wherein the temperature of said zone of highest temperature is about 70°–80° C.

3. A method as claimed in claim 1, wherein oxygen is added to said air to form oxygen-enriched air.

4. A method as claimed in claim 1, wherein said air is supplied to said reactor in the form of a stream of small bubbles over the entire cross-section of the material column.

5. A method as claimed in claim 1, wherein, for the purpose of monitoring and controlling the digestion procedure, gas samples are withdrawn from the reactor space at spaced locations thereof to determine the oxygen or carbon-dioxide content of said gas samples, the amount of air supplied to said reactor being dependent on the results of said determination.

6. A method according to claim 5, wherein the gas samples are taken from about three vertically spaced zones in the reactor to measure the $O_2$ or $CO_2$ concentrations thereat.

7. A method according to claim 5, including the step of measuring the temperature of the column of about three vertically spaced zones therein.

8. A method as claimed in claim 1, wherein, for the purpose of monitoring said process, the temperature within said reactor is determined at different spaced locations of said reactor.

9. A method as claimed in claim 1, further comprising moistening the material within said reactor by trickling water through the mixture.

10. A method as claimed in claim 1, further comprising admixing bentonite in powder form with said sludge prior to supplying said sludge to the reactor.

11. A method as claimed in claim 10 wherein the amount of bentonite admixed with said material is about 7.5–12.5 kg per cubic meter of material.

12. A method as claimed in claim 1 wherein said organic carbon-containing material is selected from the group consisting of peat, sawdust, straw, and compost material.

13. A method for digesting sewage sludge into compost, which sludge contains different anaerobic and aerobic species of micro-organisms having different oxygen consumptions and metabolisms, comprising:

continually introducing and passing the sludge downwardly through a reactor countercurrently with an upward flow of air, the rate of downward passage of the sludge upward passage of the air being controlled such that a series of different temperature and oxygen zones are formed in the reactor;

wherein the uppermost third zone of the reactor is at a temperature sufficiently high to destroy pathogenic germs in the sludge traveling therethrough and an oxygen content between 12 to 15% which is sufficiently low to sustain anaerobic decay in the sludge traveling therethrough; and the lowermost third zone of the reactor is at the lowest temperature in the reactor and possesses an oxygen content between 18 to 20% in the reactor, which zone is at the bottom of the reactor and the intermediate third zone has an oxygen content between 15 to 18%; and wherein the residence time of the sludge in the reactor is from about 14 to 12 days and is sufficiently long such that when the sludge reaches the bottom of the reactor, it is compost;

wherein the different micro-organisms settle within the reactor space at levels satisfying the requirements of each of said organisms to produce an equilibrium state as the sludge moves downwardly through the reactor such that both aerobic and anaerobic decomposition take place within the reactor; and removing the compost from the bottom of the reactor and removing the spent air from the top of the reactor.

14. The method of claim 13 wherein the reactor has a height of about 400 cm and wherein the temperature of the contents of the reactor are as follows at the height from the bottom indicated:

| | |
|---|---|
| at 70 cm | 40° C. |
| at 140 cm | 55° C. |
| at 210 cm | 64° C. |
| at 280 cm | 71° C. |
| at 350 cm | 78–80° C. |

* * * * *